(12) United States Patent
Ajro et al.

(10) Patent No.: US 6,239,991 B1
(45) Date of Patent: May 29, 2001

(54) CONTROL CIRCUIT COMPENSATING FOR MALFUNCTION OF PULSE WIDTH MODULATION CIRCUITRY

(75) Inventors: Metali Ajro, Waterbury, CT (US); George H. Harlan, Hanson, MA (US)

(73) Assignee: Nidec America Corporation, Torrington, CT (US)

( * ) Notice: Subject to any disclaimer, the term of this patent is extended or adjusted under 35 U.S.C. 154(b) by 0 days.

(21) Appl. No.: 09/642,338

(22) Filed: Aug. 21, 2000

(51) Int. Cl.$^7$ .......................................... H02M 1/12
(52) U.S. Cl. ................................. 363/41; 363/50
(58) Field of Search ................... 363/41, 50, 78, 363/124

(56) References Cited

U.S. PATENT DOCUMENTS

| | | | |
|---|---|---|---|
| 4,409,933 | 10/1983 | Inoue | 318/471 |
| 4,841,207 | 6/1989 | Cheyne | 318/599 |
| 4,965,504 | * 10/1990 | Ueda et al. | 363/41 |
| 5,457,766 | 10/1995 | Ko | 318/471 |
| 6,037,732 | 3/2000 | Alfano et al. | 318/471 |
| 6,040,668 | 3/2000 | Huynh et al. | 318/471 |

* cited by examiner

Primary Examiner—Jeffrey Sterrett
(74) Attorney, Agent, or Firm—Cummings & Lockwood

(57) ABSTRACT

A control circuit for a pulse width modulation (PWM) driven electric motor is provided for operating a fan or motor at a full duty cycle in the event that the PWM input signal should malfunction or fail. The control circuit includes a pulse width modulation (PWM) source having an output; a switch having a control and being coupled between a voltage source and the motor; a capacitor having an input coupled to the PWM output and an output coupled to the switch control, and a diode coupled between the PWM output and the switch control for maintaining the output of the capacitor at a predetermined minimum voltage level. In response to a substantially direct voltage level at the PWM output indicative of a failure of the PWM source, the capacitor maintains at its output a voltage level sufficient to cause the switch control to connect the voltage source to an input of the electric motor and drive the electric motor at a full duty-cycle. The diode provides d.c. restoration at the output of the capacitor to ensure that when the voltage level of the PWM output is time varying, an input voltage at the input of the motor substantially corresponds to the voltage level of the PWM output.

20 Claims, 3 Drawing Sheets

CONTROL CIRCUIT COMPENSATING FOR MALFUNCTION OF PULSE WIDTH MODULATION CIRCUITRY

FIELD OF THE INVENTION

The present application relates generally to an electronic control circuit. More specifically, it relates to an electronic control circuit used to provide continued operation of a pulse width modulation driven fan during a PWM input signal failure.

BACKGROUND OF THE INVENTION

Electronic equipment often uses cooling fans to maintain system temperature at proper levels. The speeds of fans can be controlled as a function of the equipment temperature or loading conditions. It is essential that fans operate reliably because the malfunction or breakdown of a fan could be destructive to electronic equipment that relies on the fan to prevent it from overheating.

One known method to control fan speed is by applying a pulse width modulation (PWM) to the input of the fan motor. With PWM systems, the duty-cycle, or on time, of the input voltage pulses can be varied to control the fan speed. One type of prior art circuit that uses PWM to control fan speed is shown in FIG. 1. Referring to FIG. 1, a signal from a PWM source is applied to a common-emitter type circuit that includes a resistive network R1, R3 and R4 and a transistor Q1. The output of this circuit is an amplified and inverted reproduction of the PWM input signal. When the PWM signal turns on transistor Q1, the fan motor is not driven because the transistor has a low resistance and most of the current flowing from the positive voltage source flows through pull-up resistor R5, through the transistor Q1 and goes to ground. On the other hand, when the PWM input signal is low enough that transistor Q1 is turned off, the current from the positive voltage source flows through resistor R5 and then through the output to drive the fan motor. One drawback associated with this type of prior art control circuit is that if the PWM input malfunctions and produces a steady high or above ground d.c. signal sufficient to turn transistor Q1 on, the circuit will produce a low or no voltage output signal that will, in turn, terminate operation of the fan. Accordingly, this type of control circuit does not reliably compensate for PWM signal failures, and can lead to fan shut down, overheating and possible damage to electronic equipment.

What is desired, therefore, is a PWM driven electronic control circuit for a fan or motor that reproduces the PWM signal during normal operation and that will compensate for a malfunction or complete failure of the PWM input signal and ensure the fan's continued operation.

SUMMARY OF THE INVENTION

The present invention is directed to a control circuit and method for controlling an electric motor driven by a voltage source, such as a fan motor, and for driving the fan motor at an approximately full-duty cycle, or other predetermined speed in response to a failure or malfunctioning of the control circuit. The control circuit comprises a pulse width modulation (PWM) source having an output; a switch having a control and being coupled between a voltage source and the motor; and a capacitor having an input coupled to the PWM output, and an output coupled to the switch control. During a substantially direct voltage level at the PWM output indicative of a failure or malfunction of the PWM source, the capacitor maintains at its output a voltage level sufficient to cause the switch control to connect the voltage source to an input of the electric motor and drive the electric motor at a full duty-cycle. A diode of the control circuit is coupled between the PWM output and the switch control for providing direct current restoration at the output of the capacitor such that when the voltage level of the PWM output is time varying, an input voltage at the motor input substantially corresponds to the voltage level of the PWM output.

Accordingly, one advantage of the electronic control circuit and method of the present invention is that during normal operation the PWM input signal is reproduced for the fan or motor, and in the event of a failure or malfunction of the PWM input signal, the fan or motor is driven at a full or substantially full duty cycle. As a result, the control circuit and method of the present invention ensure continued operation of the fan in the event of a PWM input source failure or malfunction to thereby protect sensitive electrical equipment.

Other objects and advantages of the present invention will become readily apparent in view of the following detailed description and accompanying drawings.

DETAILED DESCRIPTION OF THE PREFERRED EMBODIMENTS

Figure 1:
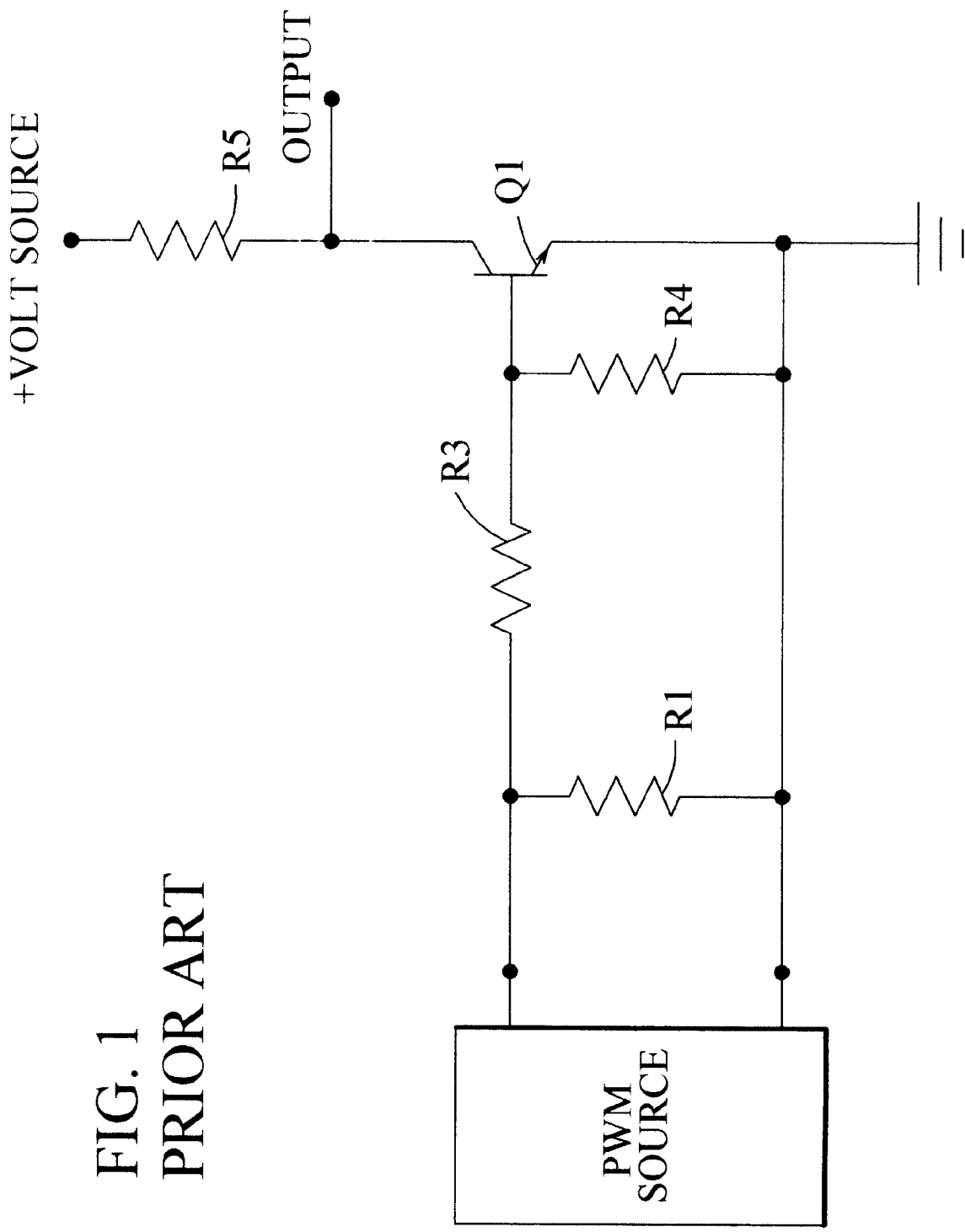
FIG. 1 is a schematic illustration of a prior art PWM driven electronic circuit for controlling a fan.
Figure 2:
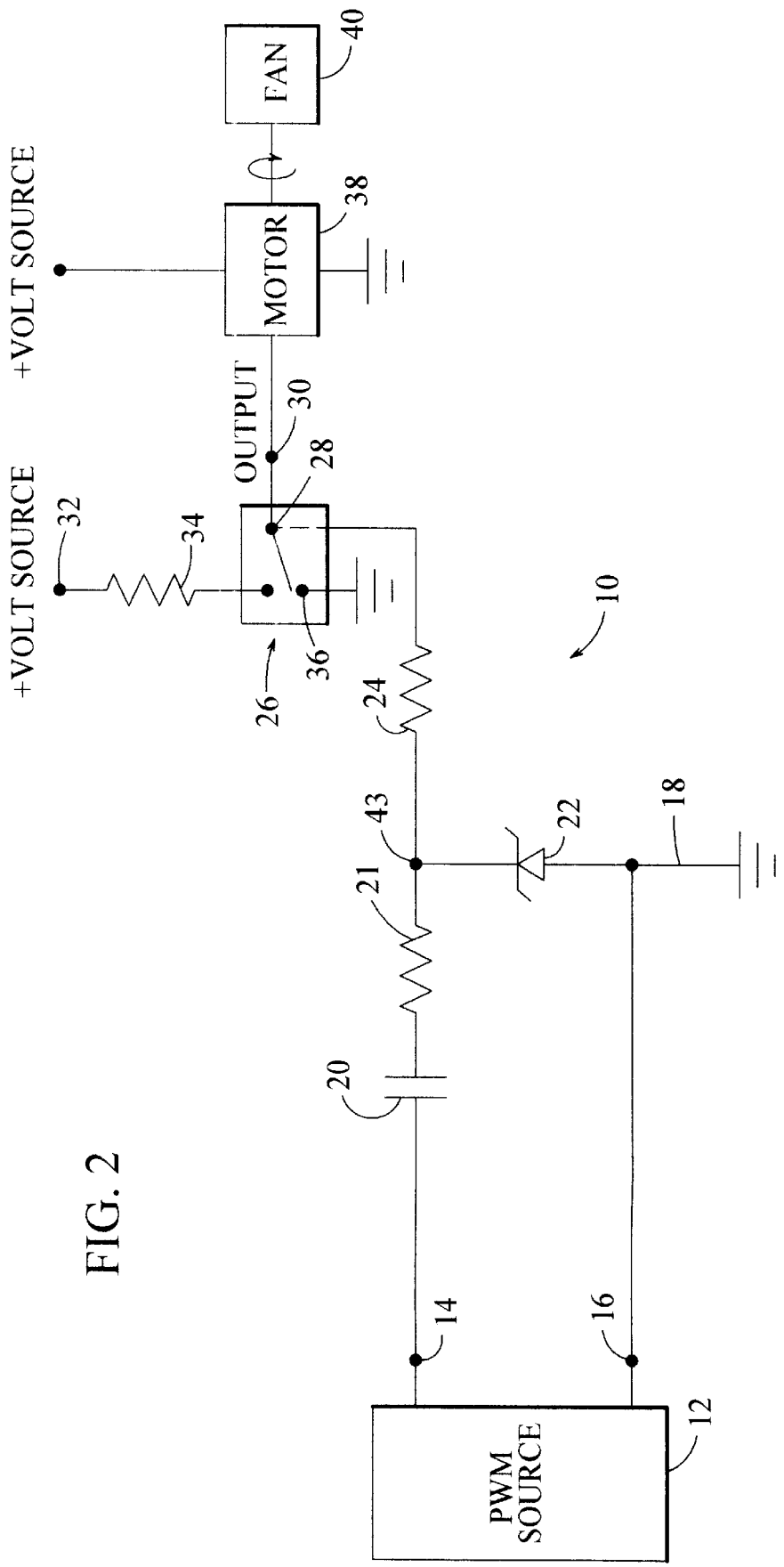
FIG. 2 is a schematic illustration of an electronic circuit for controlling a fan motor in accordance with the invention.

In FIG. 2, an electronic control circuit for controlling a fan motor or like device in accordance with the present invention is indicated generally by the reference numeral 10. The circuit 10 is driven by an external PWM source 12 having a positive output terminal 14 and a negative output terminal 16. The negative output terminal 16 is coupled to a predetermined potential 18, such as ground. Coupled to the positive output terminal 14 is the input terminal of a capacitor 20. The output terminal of the capacitor 20 is coupled a resistor 21. A diode 22 is coupled between the resistor 21 and the PWM negative terminal 16. The diode 22 and resistor 21 are coupled to a resistor 24, which is coupled to a switch 26 having a control 28. The switch 26 is coupled to the output terminal 30 and switches between a positive voltage source 32 coupled to a pull-up resistor 34, and a terminal 36 having a floating or predetermined potential. The output 30 is coupled to a motor 38 for driving a fan 40.

During normal operation, the PWM output signal activates the control 28 of the switch 26 to, in turn, switch the output 30 of the circuit 10 between the positive voltage source 32 and the predetermined potential 36, such as ground. Low frequencies of approximately 100–300 Hz have been found suitable for PWM operation, although other frequencies equally could be used.

The present invention compensates for a PWM failure by using the capacitor 20 to remove the d.c. component from the PWM signal. If a failure occurs with the PWM source 12, the signal of the PWM output 14 will likely be either no signal or a high or low direct current signal (i.e., a d.c. or direct voltage signal). Thus, when a d.c. input signal is present at the PWM output 14 indicating a PWM failure, the capacitor 20 filters out the d.c. component. The switch 26 is configured such that when a low or near zero signal occurs at switch control terminal 28, the switch will couple the output terminal 30 to the positive voltage source 32. Accordingly, the blocking of the d.c. input signal by the capacitor 20 allows the control circuit 10 to overcome a fault of the PWM output and run the fan 38 and motor 40 at full speed, thus protecting sensitive electrical equipment.

In order to ensure that the switch 28 sufficiently reproduces the PWM input signal during normal operation, the diode 22 is used to provide d.c. restoration of the signal at the output of the capacitor. As shown in FIG. 2, the diode 22 has its anode coupled to a predetermined potential 18, which is preferably ground. When the diode 22 is forward biased, the potential at the diode's cathode 43 is about –0.7 Volts. A –0.7 Volts potential at the diode's cathode 43 will keep the switch 26 coupled to the positive voltage source 32 for all d.c. inputs to the circuit, but will allow the switch to substantially reproduce a time varying signal, such as the PWM signal present at PWM output 14. Thus, the diode 22 provides d.c. restoration at the output of the capacitor 20 and the input of the switch 26 such that when the voltage level of the PWM output is time varying, an input voltage at the input of the motor 38 substantially corresponds to the voltage level of the PWM output.

Providing d.c. restoration is preferable for the present invention because if the diode were not present in circuit 10, the signal at the output of the capacitor 20 would vary in amplitude depending on the duty cycle of the PWM output signal. Capacitor 20 will center its output signal about a certain reference level, such that the signal area under the reference level will substantially equal the signal area above the reference level. Without a diode, for example, at a 90% PWM duty cycle the output signal will be low only 10% of the time, but the low value may be –5V, while the high value during the remaining 90% may be only 0.45V. Conversely, without a diode, at a 10% PWM duty cycle the output signal will be low 90% of the time, but the low value may be –0.45V, for example, while the high value during the remaining 90% may be 4.5V. This variance in the output levels of the capacitor is undesirable and thus the diode 22 is used to provide d.c. restoration to keep the output of the capacitor 22 above the value of approximately –0.7V.

A resistor 21 provides that the cathode of capacitor 20 is not tied to the d.c. offset provided by diode 22. The value of each of the resistors 21, 24 and 34 can be selected in a manner known to those of ordinary skill in the pertinent art for optimum performance of the circuit.

As may be recognized by those skilled in the pertinent art based on the teachings herein, the d.c. restoration can be provided by a diode, a zener diode, a clamping circuit for introducing a d.c. offset, a means for producing a d.c. offset such as a battery or a voltage divider using resistors, or other voltage potentials depending, for example, on the components and/or application of the circuit 10. Similarly, any of numerous other devices which are currently or later become known for performing the functions of the diode 22, such as a zener diode, may be equally employed in the control circuit of the present invention. In addition, any of numerous other devices or components that are currently or later become known for performing the function of the capacitor 20, such as an inductive network, may equally be employed in the control circuit of the invention.

Figure 3:
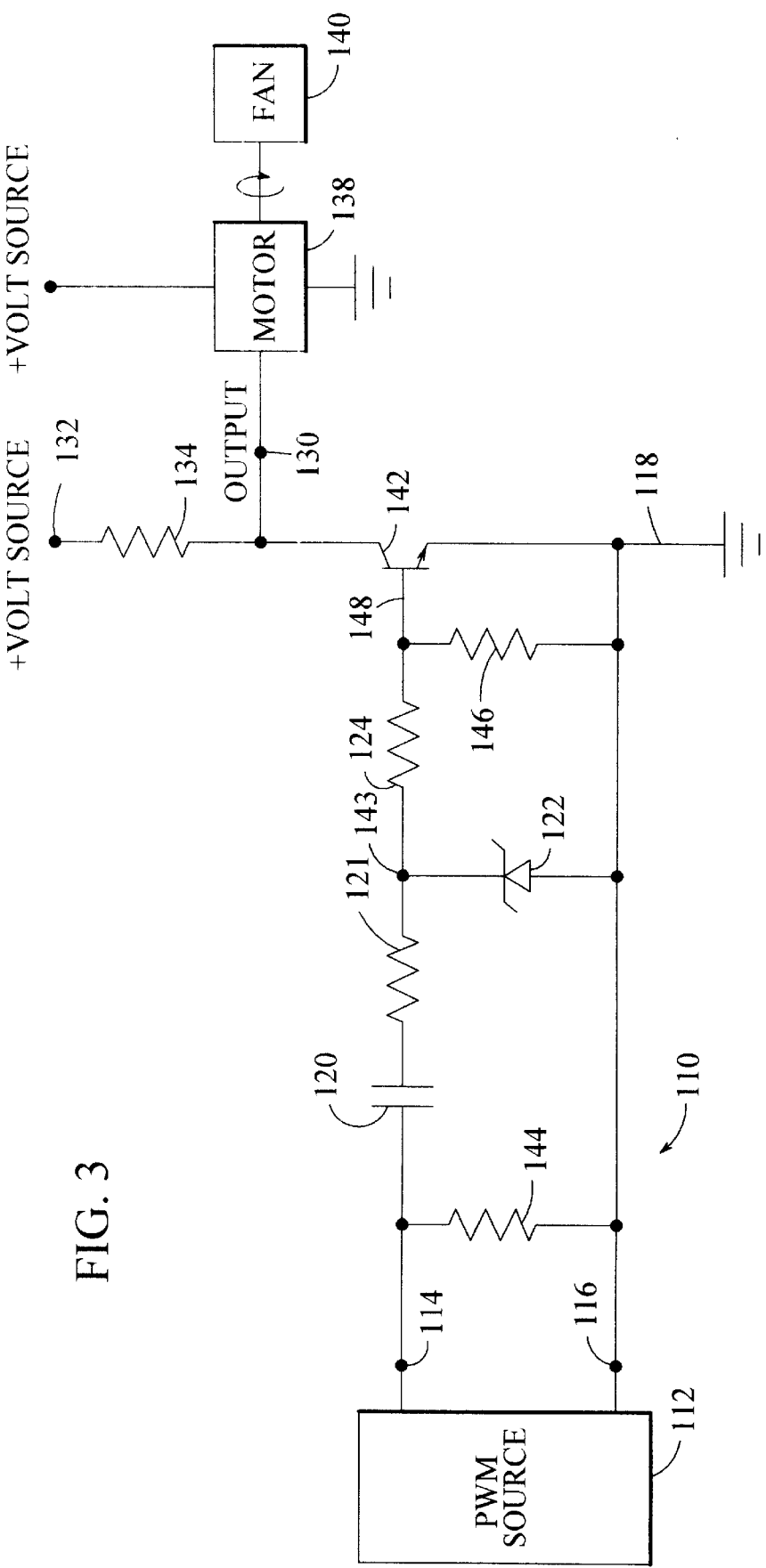
FIG. 3 is a schematic illustration of another embodiment of an electronic circuit for controlling a fan motor in accordance with the invention.

Turning to FIG. 3, another control circuit embodying the present invention is indicated generally by the reference numeral 110. The control circuit 110 is substantially similar to the control circuit 10 of FIG. 2, and therefore like reference numerals preceded by the numeral "1" are used to indicate like elements. One of the primary differences of the circuit 110 of FIG. 3 is that it employs an npn transistor 142 instead of the switch 26 of FIG. 2. As also shown, a resistor 144 is coupled between the output terminals 114 and 116 of the PWM source, and a resistor 146 is coupled between the base and the emitter of the transistor 142. The output 130 of the circuit 110 is coupled to a motor 138 for driving a fan 140.

The transistor 142 in the circuit 110 is generally in the form of a common emitter such that the input signal to the transistor base 148 is amplified and inverted at the output 130. It should be understood that the circuit of the present invention could be designed to use a pnp transistor, a p-channel or n-channel mosfet, a relay, an opti-coupler switch, a transistor configuration other than a common emitter, or other switching means which are currently or later become known for performing the function of the switches 26 and 142.

When the output signal of the PWM source 112 is time-varying, the transistor 142 substantially reproduces the PWM output signal by amplifying and inverting it. When a d.c. input signal is present at the PWM output indicating a PWM failure, however, the transistor 142 will be in its cutoff region and the positive voltage source at node 132 will substantially be present at the output 130 due to the high resistance at the collector of the transistor 142. Thus, a failure of the PWM signal 112 will drive the motor 138 and fan 140 at the output of the circuit 110 at an approximately 100% duty-cycle.

The diode 122 is a zener diode. The reverse cutoff voltage of the zener diode can have a value of 2.7 volts for clamping the upper voltage at node 143 to 2.7 volts during the positive cycle of the PWM output signal. The benefit of using a zener diode is that it provides protection for the motor 138 against a high PWM output signal, such as a high transient signal.

Experimentally, it has been found that suitable values for the components of FIG. 3 are resistor 144=47KΩ, resistor 121=100Ω, resistor 124=10KΩ, resistor 146=20KΩ, resistor 134=100KΩ, capacitor 120=0.22 µF and transistor 142= 2N2222.

It should be understood that the duty-cycle of the output 130 or the control circuit 110 will not be 100% if the failure of the PWM signal is an intermittent failure. During the time that the output of the PWM source is substantially a d.c. signal, however, the circuit 110 will drive the output 130 at an approximately 100% duty cycle. Furthermore, it should be understood that the motor or fan may have a control for setting a maximum limit of the duty cycle such that if the control circuit 10 or 110 drives the motor at a full duty cycle, the motor will operate at a duty cycle less than 100%.

A resistor 144 provides an input load for the PWM output signal and prevents static charges from accumulating on input control leads 114 and 116. A resistor 121 limits the peak input current, a resistor 124 limits the current flowing into the base of the transistor 142, and a resistor 146 provides a turn off path for the transistor 142 in the event of a discontinued signal. A resistor 134 acts a pull up resistor for the positive voltage source at node 132.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. A control circuit for controlling an electric motor driven by a voltage source, comprising:

a pulse width modulation (PWM) source having an output;

a switch having a control and being coupled between the voltage source and an input of the motor;

a capacitor having an input coupled to the PWM output and an output coupled to the switch control, wherein in response to a substantially direct current level at the PWM output indicative of a failure of the PWM source, the capacitor maintains at its output a voltage level sufficient to cause the switch control to connect the voltage source to an input of the electric motor and drive the electric motor at an approximately predetermined duty-cycle; and a diode coupled between the PWM output and the switch control for providing direct current restoration at the output of the capacitor such that when the voltage level of the PWM output is time varying, an input voltage at the input of the motor substantially corresponds to the voltage level of the PWM output.

2. The control circuit of claim 1, in combination with a fan assembly including the electric motor coupled to the control circuit, and wherein the control circuit drives the electric motor and fan at an approximately predetermined maximum speed in response to a failure condition whereby the PWM output is a substantially direct current level.

3. The control circuit of claim 1, wherein the switch is a npn transistor having a base, a collector and an emitter, the base of the transistor being coupled to the diode, the collector being coupled to the voltage source and the motor, and the emitter being coupled to an approximately predetermined voltage level.

4. The control circuit of claim 1, further comprising a resistor coupled between the diode and the capacitor for limiting a peak current of the PWM output.

5. The control circuit of claim 1, wherein the approximately predetermined duty cycle is a full duty cycle.

6. The control circuit of claim 1, wherein an anode of the diode is coupled to ground and a cathode of the diode is coupled to the capacitor.

7. The control circuit of claim 1, wherein the input voltage at the input of the motor is an inverted form of the voltage level of the PWM output.

8. A control circuit for controlling an electric fan assembly including an electric motor coupled to the control circuit and driven by a voltage source, comprising:

a pulse width modulation (PWM) source having an output;

a transistor having a base, a collector and an emitter, the collector being coupled to the voltage source and the motor, and the emitter being coupled to an approximately predetermined voltage level;

a capacitor having an input coupled to the PWM output and an output coupled to the transistor base, wherein in response to a substantially direct current level at the PWM output indicative of a failure of the PWM source, the capacitor maintains at its output a voltage level sufficient to cause the transistor to drive the electric motor at an approximate full duty-cycle; and a diode coupled between the PWM output and the transistor base for providing direct current restoration at the output of the capacitor such that when the voltage level of the PWM output is time varying, an input voltage at the input of the motor substantially corresponds to an inverted form of the voltage level of the PWM output.

9. The control circuit of claim 8, further comprising a resistor coupled between the diode and the capacitor for limiting a peak current of the PWM output.

10. The control circuit of claim 9, wherein the PWM output has two terminals, and one of the PWM terminals and the anode of the diode are coupled to ground.

11. The control circuit of claim 8, wherein the transistor is an npn transistor.

12. The control circuit of claim 8, wherein the diode is a zener diode.

13. The control circuit of claim 8, in combination with the electric fan assembly.

14. A control circuit for controlling an electric motor driven by a voltage source, comprising:

first means for generating a pulse width modulated (PWM) signal;

second means coupled between the voltage source and an input of the motor for switchably connecting the voltage source to the motor and thereby controlling the speed of the motor;

third means coupled between the first and second means for substantially blocking a direct current component of the PWM signal and causing the second means to connect the voltage source to the motor during a substantially direct current level of the PWM signal; and fourth means for providing direct current restoration at the output of the third means when the PWM signal is time varying and, in turn, causing the voltage level at the input of the motor to substantially correspond to the voltage level of the PWM signal.

15. The control circuit of claim 14, wherein the second means comprises an npn transistor having a base coupled to the third means and a collector coupled to the voltage source.

16. The control circuit of claim 14, wherein the third means comprises a capacitor having an input coupled to an output of the first means and an output coupled to the fourth means.

17. The control circuit of claim 14, wherein the fourth means comprises a diode having a cathode coupled to the third means and an anode coupled to the first means.

18. A method for controlling an electric fan assembly including an electric motor, a voltage source, and a pulse width modulation (PWM) control circuit coupled between the voltage source and electric motor, the method comprising the following steps:

provic a switch having a control terminal and being coupled between the voltage source and the motor for selectively connecting the voltage source to the motor;

providing a PWM source;

transmitting a PWM input signal from the PWM source to the control terminal of the switch to thereby control the speed of the motor substantially in accordance with the PWM input signal;

substantially blocking a direct current component of the PWM input signal and, in turn, causing the switch to connect the voltage source to the motor during a substantially direct current level of the PWM input signal; and providing direct current restoration at the control terminal of the switch when the PWM input signal is time varying and, in turn, causing the voltage level at the input of the motor to substantially correspond to the voltage level of the PWM input signal.

19. The method for controlling an electric fan assembly of claim 18, further comprising the step of providing a capacitor having an output coupled to a base of the switch and an input coupled to the PWM source, and wherein the step of providing a switch comprises providing an npn transistor having an emitter coupled to the voltage source and the electric motor and a base coupled to the output of the capacitor.

20. The method for controlling an electric fan assembly of claim 18, further comprising the step of providing a diode coupled to the output of the capacitor and the control of the switch for providing direct current restoration at the control terminal of the switch.

\* \* \* \* \*